Nov. 19, 1935.    M. W. KENNEY    2,021,691
MEANS FOR SEPARATING SOLUTION COMPONENTS
Filed March 20, 1933
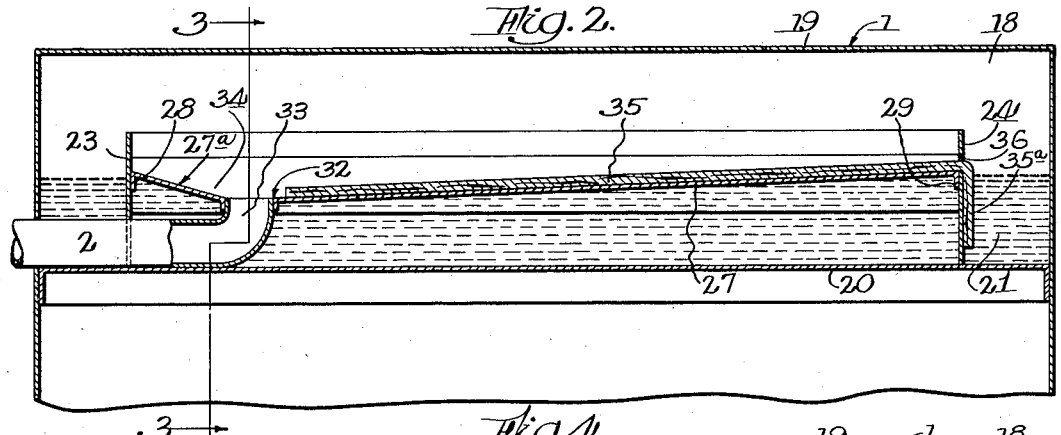
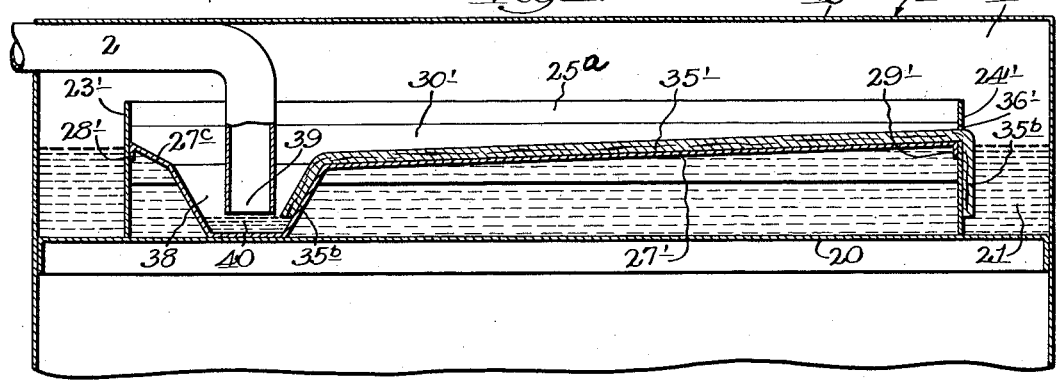
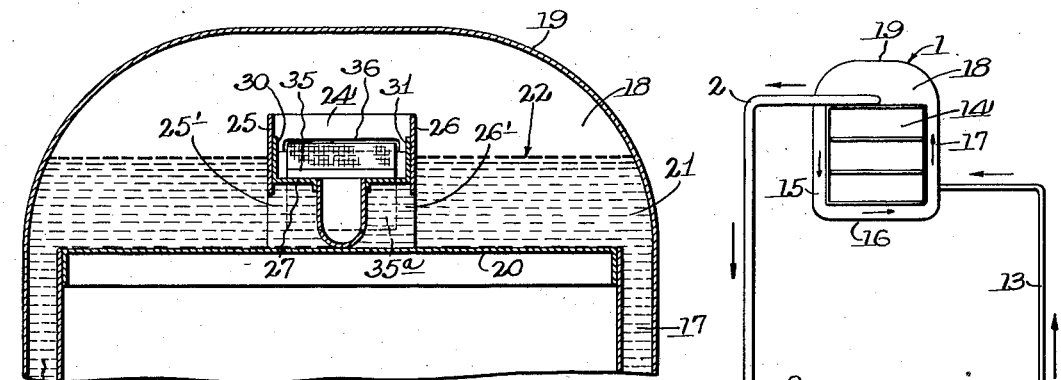
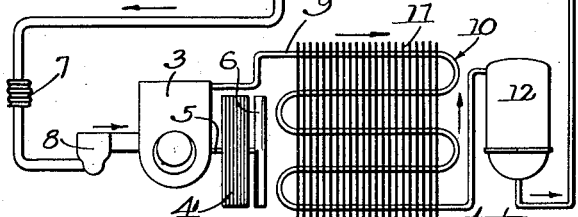
Inventor:
Mahlon W. Kenney
BY: Parkinson & Lane
Atty.

Patented Nov. 19, 1935

2,021,691

UNITED STATES PATENT OFFICE 2,021,691

MEANS FOR SEPARATING SOLUTION COMPONENTS

Mahlon W. Kenney, Berwyn, Ill., assignor, by mesne assignments, to General Household Utilities Company, Chicago, Ill., a corporation of Delaware Application March 20, 1933, Serial No. 661,662

7 Claims. (Cl. 62—126)

The present invention relates to the separation of components of liquid solutions, such as the separation of oil from a liquid refrigerant in which the oil is dissolved or mixed, in a refrigerating system.

In usual refrigeration, there is essentially an evaporation of a fluid refrigerant for the absorption of heat. The refrigerant is usually a volatile liquid contained in an evaporator, and evaporation or ebullition is effected by mechanical exhaustion or chemical absorption. The former is known as the "pressure" type of refrigeration and the latter as the "absorption" type. The present invention relates to the pressure type. In such a type, is included means for converting the vapors into liquid state for reuse in the evaporator. The converting means comprises a pump frequently referred to as a compressor, and a cooling means often termed a condenser.

The refrigerant generally used is sulphur dioxide but this substance has several disadvantages. It is corrosive, poisonous and has an obnoxious odor. In the presence of moisture or water, this substance forms an acid which attacks and corrodes the parts of the refrigerating device, causing leakage of the refrigerant and escape of its fumes. It is slightly miscible with oil, so that the oil used in the system for lubricating purposes, forms a stratum on the surface of the liquid refrigerant in the evaporator, thus reducing the evaporative effect thereof. Entry of air in the system also reduces the refrigerating efficiency of the system. When air is mixed with the vapors of some refrigerants, an explosive mixture is produced and explosions of refrigerating devices from this cause have occurred. To remove the air, it is necessary to call a service man to service the device. The same is true when water is present in the system. The purging and recharging of such a system requires considerable skill, time and effort and is dangerous. Ammonia as a refrigerant, from a mechanical standpoint, is less desirable than sulphur dioxide. Methyl and ethyl chlorides have been used but they are poisonous, inflammable and slightly explosive among other disadvantages, and are very undesirable.

The present invention comprehends the use of a refrigerant which avoids all of the disadvantages mentioned, such refrigerant being preferably dichloromethane or the like having the same or substantially the same physical characteristics. Dichloromethane is now obtainable in substantially pure state. It has the chemical formula $CH_2Cl_2$. It is non-inflammable, non-explosive, non-corrosive (with or without presence of moisture) of most metals used in refrigerating devices, non-poisonous and readily extinguishes fire, in both its liquid and gaseous or vaporous forms. At atmospheric pressure, it has a boiling point of about 105° F. and is, therefore, a liquid at all normal temperatures. Its density is about 1.33. Being a liquid it is easily handled and can be simply poured at any point desired into the refrigerating system to charge it. It does not give objectionable fumes. Its vapor has a very slight and inoffensive odor. The vapor has a higher specific gravity (about 3.0) than air, and sinks in air.

This refrigerant used with the present invention, is used at low pressure. This is very advantageous because it avoids any rupture in the system, and reduces leakage to a minimum. At an absolute pressure of 3.2″ Hg., its boiling point is 14° F. The pressure differential of the pump in the system used in connection with the present invention, is about or less than one atmosphere, and the head pressure at the pump outlet is about atmospheric. This refrigerant has a greater thermal efficiency than any other known practical refrigerant. Its co-efficient of performance is 5.14 and is only 0.6 below the theoretical maximum. It requires less horse power per ton of refrigeration produced than any other known refrigerant. The term "ton of refrigeration" means the amount of refrigeration effected when melting a ton of ice. Its factor is 0.918 as against the theoretical factor of 0.821. It is miscible with oil and hence no stratum of oil can be formed on the refrigerant in the refrigerator to strangle or choke the evaporation of the liquid refrigerant. The refrigerant used in connection with the present invention, may contain dissolved oil to the extent of 25% and the practical operation of the system occurs without decreasing the efficiency of the system. Even when the content of the evaporator is half oil, the efficiency of evaporation is but slightly affected. In other words, if it were possible but not at all probable under ordinary conditions, to dissolve sufficient oil as to constitute a large portion of the content of the system, the refrigerant still has the property of evaporating to the extent of producing a substantial exchange of heat, not materially different from the action of the refrigerant when it has practically no oil dissolved in it.

It is an object of the present invention to provide novel means for and a novel method of separating the oil from the refrigerant in which the oil is dissolved, and to maintain the contents of the oil in the refrigerant in the evaporator, below a given point. I have found that with my invention I may maintain the oil content below 1% of the liquid in the evaporator of the system.

Another object of the invention is to provide a novel means for and a novel method of separating one component of a solution from another, as the oil from the refrigerant component of the solution in a refrigerating system, by the drawing or transferring of the solution into a porous body, as by capillary attraction or the like, and subjecting the solution in the pores of the body to such pressure and temperature as will cause or effect an evaporation of one of the components, such as the refrigerant component, and leave another component, such as the oil, in liquid state, with or without means for and the step of carrying or conducting away either or both of the components after their separation.

Other objects, capabilities, advantages, features and process steps are comprehended by the invention as will later appear and as are inherently possessed by the invention.

Referring to the drawing;

Fig. 1 is a schematic view of a refrigerating system using the present invention;

Fig. 2 is a longitudinal sectional view taken through a part of the evaporator of the system and one form of device constructed in accordance with the invention;

Fig. 3 is a transverse sectional view taken in planes represented by line 3—3 in Fig. 2 of the drawing; and, Fig. 4 is a view similar to Fig. 3 of an alternate form of device.

Referring more in detail to the drawing, the embodiments selected to illustrate the invention, are shown in connection with a refrigerating system comprising an evaporator 1 connected by way of a duct 2 leading to a pump 3 which is operated by a motor 4 by way of a shaft 5. A fan 6 is connected to the end of the shaft for causing a movement of cooling air through the cooling part of the system, later described. The duct 2 has a duct section or segment 7 which is flexible or compliant so as to absorb and prevent transmission of vibrations from the motor operated parts to the system to the other parts thereof.

The duct 2 also is provided with a check valve 8 connected closely to the pump so as to prevent back flow from the pump 3. From the discharge side of the pump leads a duct 9 to a cooling coil or condenser 10 which is in the form of a serpentine and carrying cooling fins 11, the coils 10 continuing to a trap chamber 12. The latter is of such a size as to contain the liquid refrigerant charged into the system, and it includes therein (not shown) a float valve adapted to control the flow of the liquid refrigerant by way of a duct 13 to the evaporator 1. The condenser is shown conventionally in the drawing, but in actual practice it is disposed in a plane parallel to the plane of rotation of the fan 6, the latter operating to cause a flow of cooling air through the condenser so as to cool and condense the vapors delivered to the condenser from the pump 3.

The evaporator 1 surrounds and embraces the freezing zone box or compartment 14, and comprises circulatory ducts 15, 16 and 17 located at the sides and bottom of the compartment 14, and a chamber 18 in the upper part of the evaporator, this chamber having a dome 19 and a crown sheet 20. The refrigerant circulates through the system as indicated by the arrows, and also in the evaporator circuit, that is, in the passages 15, 16 and 17 and the space or chamber 18, as indicated by arrows in Fig. 1. The liquid refrigerant as indicated at 21 may be normally at such a level as indicated at 22, in the chamber 18 of the evaporator 1. The pump 3 reduces the pressure in the chamber 18 and causes the liquid 21 to boil or undergo ebullition and to evaporate. The vapors are drawn off or exhausted by way of the duct 2 having its inlet portion extending into the chamber 18 as more fully described later.

Referring to Figs. 2 and 3 showing one form of separator, the separating device is in the form of an open top receptacle comprising end walls 23 and 24, side walls 25 and 26 and an inclined bottom wall or plate 27. The end walls 23 and 24 extend downwardly as legs to stand on the crown sheet 20 and to support the separating device at the proper height with respect to the normal liquid level 22 in the chamber 18, the space beneath the lower edges 25' and 26' of the side walls 25 and 26 and the crown sheet 20, being ample for free circulation of the liquid refrigerant in the chamber 18.

The inclined wall or plate 27 has flanges 28, 29, 30 and 31 respectively secured and sealed to the walls 23, 24, 25 and 26, the flanges 28 and 29 extending downwardly and in engagement with the end walls 23 and 24 and the flanges 30 and 31 extending upwardly and in engagement with the side walls 25 and 26, as clearly shown in Figs. 2 and 3. The major portion of the bottom 27, is inclined or pitched downwardly from the flange 29 which is preferably located higher than the level 22 of the liquid, and at its lower end is provided with an opening 32 in which is connected the inlet 33 of the duct 2 which extends to the exterior of the chamber 18 of the evaporator, as clearly shown in Fig. 2. From the opening 32 the wall 27 continues with an upwardly inclined wall portion 27ᵃ leading to the flange 28, thus providing trough 34 for the flow thereinto of a component of the solution after separation, as later described.

Upon the bottom portion 27 is located a porous member or body 35 which may be composed of wick-like material, whether textile fibres or metal fibrous material or fabric. This member extends over the surface of the member 27 from the lower part thereof near the opening 32 to the upper part thereof and through an opening or aperture 36 provided in the end wall 24, and further extends downwardly into the liquid 21 to form a dipping portion 35ᵃ.

Referring to Fig. 4, the form of separator shown therein, comprises an open top receptacle comprising end walls 23' and 24', side walls 25ᵃ, and an inclined bottom wall or plate 27'. The end walls 23' and 24' extend downwardly as legs to stand upon the crown sheet 20 and to support the separating device at the proper height with respect to the normal level 22 of the liquid refrigerant in the chamber 18, the space beneath the lower edges of the side walls 25ᵃ and the crown sheet being ample for free circulation of the refrigerant. The bottom 27' is provided at its ends with depending flanges 28' and 29' respectively secured and sealed to the end walls 23' and 24', and with upstanding side flanges 30' respectively secured and sealed to the side walls 25ᵃ. The major portion of the bottom 27' is inclined or pitched downwardly from the flange 29' which is preferably higher than the normal level 22 of the liquid 21. The lower end of the bottom is connected to a trough 34 in which one of the separated components of the solution, may accumulate as later described. The trough is connected with a bottom portion 27<sup>c</sup> inclined upwardly and connected to the flange 28' as clearly shown in Fig. 4.

Upon the inclined bottom 27' is a porous body or wick-like member 35', the same as member 35, and extending over the inclined bottom 27' and having a depending end portion 35<sup>b</sup> in the trough 38. At the upper end of the bottom 27', this member extends through an opening 36' provided in the end wall 24', and downwardly into the liquid 21 to form a dipping end portion 35<sup>c</sup>. In the trough 38 depends the inlet end 39 of the duct 2 which extends to the exterior of the chamber 18 of the evaporator.

In the operation of the refrigerating system, oil is used in the pump for lubrication and the like. Some of the oil is carried over with the vapors of the refrigerant and becomes dissolved in or mixed with the liquid refrigerant used in the system. As the liquid reaches the evaporator, and the refrigerant component is evaporated, the oil component remains and the percentage of the oil in the liquid in the evaporator increases. The purpose of the present invention is to remove the oil at such a rate that the percentage of oil in the liquid in the evaporator may be maintained below a given amount. I have found that by my invention I am able to keep this percentage below 1%.

As the liquid in the chamber 18 is boiled or caused to undergo an ebullition, some of the liquid is drawn up by capillary attraction or the like by the dipping portion 35<sup>a</sup> or 35<sup>c</sup> as the case may be, so as to transfer such liquid or solution into the pores of the porous member 35 or 35<sup>b</sup> extending over the inclined bottom wall 27 or 27'. At the same time, the exhausting effect of the pump acting through the duct 2 causes a reduction of pressure in the chamber 18 such as to cause the boiling, at a low temperature, of such liquid, and to withdraw the vapors given off thereby. This low pressure acts also upon the solution held or carried by the porous body 35 or 35' so as to cause an evaporation of the refrigerant component but to leave the oil in liquid state. This oil gradually flows through the porous body 35 or 35' to the lower end of the inclined bottom 27 or 27', and into the inlet 33 of the duct 2 or into the trough 38. In the latter case, the oil may accumulate as indicated at 40 and at intervals when the refrigerating system automatically starts to reoperate after an interval or pause, the oil accumulated in the trough 38 will be drawn upwardly through the duct part 39, as a slug of oil, and be carried over into the duct 2 and hence to the pump to be returned to the oil in the pump casing. The pressure in the chamber 18 is sub-atmospheric and the temperature is subnormal, and as previously indicated, with an absolute pressure of 3.2" Hg., the liquid refrigerant or the refrigerant component of the solution or liquid in the chamber 18 and in the pores of the porous member 35 or 35', will evaporate at a temperature of about 18° F. In this way the oil may be removed from the solution at such a rate as to maintain the oil content in the evaporator below 1% of the liquid therein.

By experiments that I have conducted in connection with my invention, I have found that in practice the device appears to operate best or with the most effective separation when the bend of the porous member at the opening 36 or 36', is about 1" above the normal level 22 of the liquid 21 in the evaporating chamber 18. I have also found that the maximum height of the bend above the liquid level is about 2", for practical operation.

While I have herein described and upon the drawing shown a few illustrative embodiments of the invention, it is to be understood that the invention is not limited thereto but comprehends other constructions, arrangements of parts, details, features, and process steps without departing from the spirit of the invention.

Having thus disclosed the invention, I claim:

1. In a refrigerating system, a device for separating components of a solution the components of which have different evaporative characteristics, comprising an inclined wall having a discharge means at its lower end, a porous member on said wall and extending over the upper end thereof for dipping in the solution and acting with capillary attraction to draw the solution into the pores of said porous member, and means for subjecting the solution carried by said porous member to such pressure and temperature as to effect an evaporation of a component of the solution and to leave another component of the solution in liquid state.

2. In a refrigerating system, a device for separating components of a solution the components of which have different evaporative characteristics, comprising an elongated inclined wall having a discharge means at its lower end, an elongated porous member extending over the surface of said elongated inclined wall and extending over the upper end thereof for dipping in the solution and acting with capillary attraction to draw the solution into the pores of said porous member, and means for subjecting the solution carried by said porous member to such pressure and temperature as to effect an evaporation of a component of the solution and to leave another component of the solution in liquid state.

3. In a refrigerating system, a device for separating components of a solution the components of which have different evaporative characteristics, comprising a slightly inclined wall having a trough at its lower end and a crest at its upper end, a porous wick-like member extending over the surface of said inclined wall from the trough to the crest and extending over the crest to dip in the solution and acting with capillary attraction to draw the solution into the pores of said member, and means for subjecting the solution carried by said porous member to such pressure and temperature as to effect an evaporation of a component of the solution and to leave another component of the solution in liquid state.

4. In a refrigerating system having an evaporator, a device for separating oil from the refrigerant used in said system, comprising a long slightly inclined wall in the evaporator and having its upper end located above the level of liquid in the evaporator, and having a discharge means at its lower end, a porous member extending over the surface of said inclined wall and over the upper end thereof and dipping into said liquid in said evaporator for drawing the liquid by capillary attraction into said porous member on said wall, and means for subjecting the liquid in said member to such pressure and temperature as to effect an evaporation of the refrigerant component of said liquid in said member and to leave the oil in liquid state for the oil to pass to the discharge means.

5. In a refrigerating system having an evaporator, a device for separating oil from the refrigerant used in the system, comprising a receptacle having side and end walls extending above the level of the liquid in the evaporator and having an inclined bottom, a duct connected with the lower end of said bottom, a porous member extending over said bottom and over the upper end of said bottom and into said liquid for acting with capillary attraction to draw said liquid into the pores of said member, and means for subjecting the liquid carried by said porous member to such pressure and temperature as to effect an evaporation of the refrigerant component of said liquid and to leave the oil component of said liquid in liquid state for delivery to said duct.

6. In a refrigerating system having an evaporator, a device for separating oil from the refrigerant used in the system, comprising a receptacle having side and end walls extending above the level of the liquid in the evaporator and having an inclined bottom, a trough at the lower end of said bottom, a duct leading from said trough to the exterior of said evaporator, a porous member extending over said bottom and over the upper end of said bottom and into said liquid for acting with capillary attraction to draw said liquid into the pores of said member, and means for subjecting the liquid carried by said porous member to such pressure and temperature as to effect an evaporation of the refrigerant component of said liquid and to leave the oil component of said liquid in liquid state for delivery to said trough and duct.

7. In a refrigerating system having an evaporator, a device for separating oil from the refrigerant used in the system, comprising a receptacle having side and end walls extending above the level of the liquid in the evaporator and having an inclined bottom, a duct connected with the lower end of said bottom, the upper end of said bottom being above the level of said liquid, the end wall at the upper end of said bottom having an opening at said upper end of said bottom, a porous member extending over said bottom and through said opening and into said liquid for acting with capillary attraction to draw said liquid into the pores of said member, and means for subjecting the liquid carried by said porous member to such pressure and temperature as to effect an evaporation of the refrigerant component of said liquid and to leave the oil component of said liquid in liquid state for delivery to said duct.

MAHLON W. KENNEY.